United States Patent [19]

West et al.

[11] Patent Number: 5,026,753

[45] Date of Patent: Jun. 25, 1991

[54] RESINOUS BINDERS COMPRISING A METAL ROSIN RESINATE AND A CARBOXYLATED POLYSTYRENE RESIN

[75] Inventors: James C. West; Mark S. Pavlin, both of Lawrenceville, N.J.

[73] Assignee: Union Camp Corporation, Wayne, N.J.

[21] Appl. No.: 313,926

[22] Filed: Feb. 22, 1989

[51] Int. Cl.$^5$ ............................................. C08L 93/04
[52] U.S. Cl. .................................. 524/272; 524/270; 524/274
[58] Field of Search ...................... 524/274, 270, 272

[56] References Cited

U.S. PATENT DOCUMENTS

| | | | |
|---|---|---|---|
| 3,681,268 | 8/1972 | Bunk et al. | 524/274 |
| 3,929,703 | 12/1975 | Weymann et al. | 524/274 |
| 3,932,329 | 1/1976 | Lakshmanan | 524/274 |
| 4,067,938 | 1/1978 | Jack | 524/274 |
| 4,116,910 | 9/1978 | Rudolphy | 524/270 |

*Primary Examiner*—John Kight, III
*Assistant Examiner*—Dennis R. Daley
*Attorney, Agent, or Firm*—Edward J. Sites

[57] ABSTRACT

A resinous binder is disclosed which is composed of a metal rosin resinate and a dilution increasing effective amount of polystyrene type resin having greater than 50,000 weight average molecular weight and an acid number less than 200.

Also disclosed is a gravure printing ink which comprises a solvent, a colorant and a binder component wherein all or a portion of the binder component consists of the resinous binder of this invention. The use of the resinous binder of this invention in ink compositions results in significant dilution improvement without adversely affecting other desirable properties.

16 Claims, No Drawings

RESINOUS BINDERS COMPRISING A METAL ROSIN RESINATE AND A CARBOXYLATED POLYSTYRENE RESIN

This invention relates to novel resinous binders and their use in gravure ink compositions and, more particularly, is concerned with resinous binders having a high "dilution," comprised of a metal rosin resinate and a polystyrene type polymer.

BACKGROUND OF THE INVENTION

Inks used for gravure printing are comprised of a colorant, a binder and a solvent. It is crucial to the performance of gravure inks that they have the correct flow characteristics, in particular the correct viscosity. This is important in the inking of the recessed cells of the etched or engraved printing cylinder and the delivery of the ink from the cells of the plate to the substrate. The viscosity of the ink is also important in order to achieve an acceptable degree of holdout (resistance to penetration) of the ink when printed on paper, especially uncoated paper stock having high porosity. The lower the ink viscosity the more severe is the problem of lack of holdout.

The proper ink viscosity can be easily achieved by the use of greater amounts of binder and lesser amounts of solvent, but this increases the overall cost of the final ink. Also, use of large amounts of binder to obtain the desired viscosity means that in the final thinning of the ink by the printer less solvent can be employed, giving the printer less latitude in his formulations. The inks which cannot readily be diluted are also perceived by printers to have "low mileage," that is, less paper coverage per gallon. Printers prefer ink that can be diluted with greater amounts of solvent because of the benefits of economy of the final ink formulation and convenience in the formulation process.

The term "dilution" is a term of art used by ink formulators to describe the amount of solvent required to thin a given ink composition to a desired viscosity. The term may also be used for unpigmented resin solutions generally referred to as varnishes. In this context, the dilution of a resin or varnish is related to the property of "intrinsic viscosity" as used in the polymer art, that is, the higher the resin molecular weight, the higher the viscosity of solvent solution at lower concentrations and, therefore, the higher its possible dilution.

Metal rosin resinates have commonly been employed as ink binders in the formulation of gravure inks. The resinate serves to provide the ink with the necessary viscosity, transfer, printed gloss and rub resistance. However, achieving the desired high dilution with a metal rosin resinate alone has been difficult if not impossible to achieve because of the generally very low molecular weights typical of this class of resins.

In particular, desirable high dilution values in the range of 90–100 mls toluene, to reach print viscosity of about 7.5 cps as measured from 50% solids concentration, can be achieved only by neutralizing the resinate system to nearly 100% of theoretical with zinc oxide, magnesium oxide, and/or calcium hydroxide. This, however, results in unacceptably high resinate viscosity and severe viscosity instability. In other words, the high dilution resinates can be made using conventional resinate formulations but they are too viscous to use conveniently, are difficult to manufacture, and are prone to increase further in viscosity during storage. Furthermore, the higher dilution values of about 110 mls cannot be achieved using the above-described conventional approaches.

Various additional resins have been combined with the metal rosin resinates or added to the ink as dilution builders and also as binders in their own right. Highly phenol-modified rosins can be used in place of conventional rosins to achieve high dilution. However, these rosins are expensive and the resulting phenol-contaminated manufacturing waste must be treated or disposed as hazardous waste to avoid damage to the environment, which further increases the resinate cost. Cellulose derivatives are widely used in the industry to build ink dilution. These derivatives, especially ethyl cellulose and ethyl hydroxyethylcellulose, have very high molecular weights. However, they are very expensive and have poor compatibility with resinates.

It has recently been taught by Janusz, U.S. Pat. No. 4,690,712 (1987), that reaction products of a metal rosin resinate and an amino-polyamide are useful as vehicles for publication gravure printing inks. Dilution improvements are reported. In making such reaction products, the polyamide must have sufficient amino groups so as to be soluble in toluene and also to be able to react in the ratio of 1-5 equivalents of the amino-polyamide to 1-5 equivalents of the carboxyl groups of the metal resinate. This need for balancing the stoichiometry of amino and carboxyl groups poses reproducibility and even gelation problems, as well as requiring more of the relatively costly amine to be used relative to the less costly resinate acid. The solubility requirement severely limits the softening point and molecular weight of the amino-polyamide. Additionally, inks prepared with these polyamides are excessively thixotropic, which is undesirable for a fluid gravure ink.

The prior art also describes the use of high acid number, low molecular weight polycarboxylic polymers to improve resinate properties. For example, Schefbauer, in U.S. Pat. No. 4,244,866 (1981), teaches the use of alpha-olefin/maleic anhydride copolymers and partial esters thereof with limed rosin to prepare novel resinates. Schefbauer nowhere discloses achieving particularly high dilution. The polymers disclosed by Schefbauer are claimed to allow the preparation of resinates with very high lime levels. To achieve this end, the polymers must have low molecular weights and high acid numbers, typically over 130, and are used in relatively large amounts, typically 10 weight percent on a total solids basis. These polymers have poor toluene tolerance and, in fact, are used as solutions in 60/40 toluene/methyl ethyl ketone. This approach necessarily introduces an undesired solvent, a ketone, into the gravure ink in significant amounts.

SUMMARY OF THE INVENTION

A resinous binder is disclosed which is composed of a metal rosin resinate and a dilution increasing effective amount of polystyrene type resin having greater than 50,000 weight average molecular weight and an acid number less than 200.

Also disclosed is a gravure printing ink which comprises a solvent, a colorant and a binder wherein all or a portion of the binder consists of the resinous binder of this invention. The use of the resinous binder of this invention in ink compositions results in significant dilution improvement without adversely affecting other desirable properties.

DETAILED DESCRIPTION OF THE PREFERRED EMBODIMENTS OF THE INVENTION

The rosin resinates employed to prepare a major portion of the ink binder compounds of this invention are well known as are the methods of their preparation. The resinate used may be any one of those conventionally used as binders in gravure printing inks. These are typically metal rosin resinates which can include but are not limited to zinc, magnesium and calcium resinates of rosins such as gum rosin, wood rosin and tall oil rosin, polymerized or dimerized rosins, formaldehyde-modified rosins, phenol-modified rosins, hydrocarbon-modified rosins, maleic-modified rosins, fumaric-modified rosins and the like.

The metal rosin resinates may be prepared according to the methods described, for example, in the U.S. Pat. Nos. Nos. 4,198,329 (Rudolphy et al., 1980), No. 4,528,036 (Rudolphy, 1985), and No. 4,552,592 (Rudolphy et al., 1985), all of which are incorporated herein by reference.

The polystyrene type resin added to the metal rosin resinates to prepare the resinous binders of the invention are those having a weight average molecular weight ($M_W$) of at least about 50,000 Daltons and an acid number of from about 0 to about 200 and preferably 0 to about 125. Methods of preparing these polymers are well known. The polystyrene type resins which are preferably used in this invention are styrene-based resins and carboxylated styrene based resins. Many such polymers are available commercially in a variety of forms, such as pellets, latices and powders. Even recycled foamed polystyrene recovered from the manufacture of cups, packaging items or the like may be acceptable.

A preferred polystyrene type resin is carboxylated polystyrene derived from a styrene-maleic anhydride (SMA) copolymer having a maleic anhydride content of up to about 10 percent. SMA itself is not effective in increasing dilution of a rosin resinate. However, the anhydride groups present in SMA are readily opened by water, mono-alcohols or mono-amines to give carboxylated polystyrenes with excellent dilution-improving power.

The styrene-maleic anhydride copolymers employed are also well known compounds. They may be prepared by the method described in the U.S. Pat. No. 3,336,267 issued to Zimmerman and O'Connor on Aug. 15, 1967 and incorporated herein by reference. In general, the styrene-maleic anhydride copolymers are the polymerization product of from 4 to 10 mole percent of maleic anhydride and from 96 to 90 mole percent of a styrene and have $M_W$ of between 150,000 and 300,000.

The polystyrene type resins used in the present invention may also contain minor amounts of modifying monomer units such as isoprene, butadiene, acrylonitrile, acrylic and methacrylic esters, and substituted styrenes, especially p-alkylstyrenes. These monomers may be present in amounts up to about 40% of the polystyrene type polymer by weight as long as they do not cause incompatibility with the resinate system.

The metal rosin resinate and the polystyrene type resin may be combined by charging the two resins and additional inert solvent as required in an appropriate vessel and heating the mixture, with stirring, to a temperature within the range of from about 25° C. to 100° C., preferably about 70° C. to 90° C., at sub- or super- atmospheric pressures, advantageously at autogenous atmospheric pressures. More preferably, the metal rosin resinate is prepared from the rosin and the other required ingredients in the presence of the polystyrene type resin and, most preferably, the polystyrene type resin is charged at the beginning of the process. This is essential when the polystyrene type resin is an SMA so that the anhydride groups are opened by the water formed by reaction of the metal salts and the rosin to give the effective carboxylated polystyrene rosin.

The polystyrene type resin comprises a minor proportion of the resinous binder, the majority proportion being the metal rosin resinate. The amount of the polystyrene type resin in the resinous binders may vary widely, for example, from about 0.1% to 20% on total solids of the final formulation of the resinous binder. It is preferred to use as little of the polystyrene type resin as is effective to increase the dilution value of the final product to the desired level of at least 90 mls an more preferably at least 100 mls as measured from a concentration of 50% solids to a print viscosity of about 7.5 cps so as to keep the formulation cost and product viscosity to a minimum. For these reasons, the preferred use level of the polystyrene type resin is about 0.5 to 6%, solids basis.

The resinous binder is advantageously prepared in the presence of an inert solvent. The term "inert solvent" as used herein means a solvent for the starting materials which does not enter into or adversely affect the desired course of the preparation. Representative of inert solvents are toluene, Lactol spirits, and like hydrocarbon solvents.

There are many variations in the art for the preparation of metal rosin resinates. These include modification of rosin with phenols and formaldehyde, maleic anhydride and/or fumaric acid, hydrocarbon materials such as dicyclopentadiene, poly(dicyclopentadiene), and low-cost materials such as tall oil pitch and urea. The polymers of the present invention may be used in combination with all such metal rosin resinates having any level of dilution to improve dilution, although the efficacy of a particular polystyrene type polymer may vary according to the exact composition of the base metal rosin resinate. For example, the polystyrene resins of the present invention may be combined with a low dilution resinate to give a moderate to high dilution resinate. In the preferred embodiment of the invention, the polystyrene type resin is combined with a resinate having moderate to high dilution to give a new resinate having acceptable viscosity, good viscosity stability, and about 100–110 mls toluene dilution measured from 50% solids to a print viscosity of 7.5 cps.

Those skilled in the art will appreciate other variations which may be used to prepare the resinates of the invention. It should be appreciated, for example, that certain polystyrene type resins (e.g., polystyrene powders) can be blended into the metal rosin resinate base at ambient temperatures and may even be added directly with the resinate to an ink formula during its preparation.

The gravure ink compositions of the invention are prepared by simple admixture of a binder component at least a portion of which is comprised of the resinous binder of the invention, a colorant, a solvent and, optionally, other conventional binders. The proportion of binder component which is used is an amount which is effective to function as an ink binder, generally from 10 to 35 percent by weight of the final ink. The amount of the resinous binder which is included in the binder is an amount which is effective to increase the dilution.

The colorant may be any of the known pigments used in publication gravure inks, such as carbon black, iron blue complexes, barium lithol reds, azo yellows, phthalocyanines, or any other desired pigments of the types customarily used in such inks. The colorant can be added as such, or predispersed in a liquid resinate medium to make an ink base as is commonly practiced in ink formulations. The choice of colorant is within the skill of the ink compounder and is not a critical feature of the invention, except that a pigment normally is present in a gravure printing ink. Soluble dyes may also be used, and the term colorant is meant to encompass both dyes and pigments. A coloring-effecting proportion of the colorant is used in the composition, generally 0.5 to 10 weight percent of the ink composition.

The solvent may be any of the aromatic hydrocarbon solvents conventionally used in publication gravure ink formulation, such as toluene, xylenes, trimethylbenzenes, aliphatic and aromatic naphthas, or the like, the preferred solvent being toluene for reasons of cost, acceptable toxicity and good rheological and evaporation properties. The solvent is used in an amount sufficient to wet and disperse the resinate and pigment with an acceptable print viscosity.

Additional components may be present in the inks of the invention, such as dispersing agents, surfactants, minor amounts of cosolvents, odorants, and the like.

Advantageously, the inks of the invention are prepared by first dispersing a pigment (or pigment concentrate) in any known low viscosity ("grinding") resinate by sufficient agitation, and shearing to comminute and disperse the pigment particles using a ball mill, shot mill or other equipment designed for this purpose. This concentrated pigment dispersion ("ink base") is then mixed with good agitation with the high-dilution resinous binder of the invention. The final ink is obtained by adding solvent to this piqment-resinate mixture until the desired viscosity is reached.

The resinous binders of the present invention are distinguished from the prior art resinates in that the polystyrene type resins have neither high amine number nor high acid number and possess high molecular weight and excellent toluene solubility rather than low molecular weight and marginal toluene compatibility. Polystyrene type rosins are much less expensive than the cellulose derivatives heretofore used, possess a very high Tg, and have excellent toluene solubility. The use of additional expensive cellulosic dilution builders can be decreased or avoided where these new resinous binders are employed. In consequence, the cost-effective use level of the polystyrene type resins is lower and the over-all resinous binder cost is lower. In addition, the gelation problems associated with the use of the aminopolyamide-modified resinates of the prior art are avoided, as is the use of a compatibilitizing solvent such as an alcohol or ketone.

Those skilled in the art will appreciate these and other advantages described hereinafter and associated with the resinous binder and ink compositions of the present invention.

The following examples show the manner and process of making and using the invention and sets forth the best mode contemplated by the inventors for carrying out the invention, but are not be construed as limiting the scope of the invention.

In the following examples, non-volatiles (or solids) content, or NV, is measured by weighing a 1-5 g sample of resinate into a metal pan and evaporating the solvent, first at room temperature for about 1 hour, and then in a vacuum oven for 45 minutes at a temperature of about 100° C. The sample is then cooled and re-weighed. NV is then calculated by the formula:

$$NV = \frac{\text{Residue Weight}}{\text{Sample Weight}} \times 100\%$$

Dilution measurements are made following industry standard practice by weighing out a 100 g resinate sample having about 50% non-volatile content and adding toluene to this at about 25° C. with stirring. The Shell No. 2 Cup viscosity of the blended sample is measured and toluene addition continued until a reading of 18.0 seconds, equivalent to about 7.5 cps, is obtained. Dilution is recorded as the number of milliliters of toluene used to achieve this viscosity.

Alternatively, the concentration at print viscosity (CPV) can be determined by diluting a sample of resinate of any NV until the blend viscosity falls to 18.0 seconds, No. 2 Shell Cup. The dilution from 50% NV can be calculated from the CPV by the equation:

$$\text{Dilution (50\% } NV\text{)} = \frac{\frac{5000}{CPV} - 100}{0.867}$$

where 0.867 is the density of toluene.

Resinate solution viscosity was measured at 25° C. by the Gardner-Holt Method, which is a well-known industry determination of the bubble rise type essentially identical to ASTM D-1545-76. It is important to appreciate that dilution values tend to increase with increasing viscosity of the resinate. However, the resinate must have sufficiently low viscosity as to be pumpable at ambient temperatures. For this reason, resinate viscosity must be kept below about 5,000 cps or about a Z2 on the Gardner Scale. The resinates of the following examples were prepared to meet a target of Z-Z1, with the exception of the comparison example, Example 2.

EXAMPLE 1

To a 3-liter round-bottomed flask equipped with overhead stirrer, water-jacketed condenser, nitrogen inlet and thermocouple probe was charged 753 g of a tall oil rosin ("Unitol NCY,"a product of Union Camp Corporation, Wayne, N.J. ) having an acid number of 165 and a Ring & Ball softening point of 75° C., 188 g of a 55 acid number tall oil pitch, and 73 g of polystyrene obtained from Aldrich Chemical Company, Catalog No. 18,242-7, having a weight average molecular weight of about 250,000. This charge of polystyrene amounted to 6% by weight of the solids content of the final product formulation. This mixture was heated with stirring at 240° C. for 30 minutes. To this mixture was then added 80 g of fumaric acid. The reaction mixture was held an additional 1 hour and 30 minutes at 230° C. then cooled to about 120° C. Toluene (650 g) was added and the reaction mass cooled to 85° C. To the toluene solution of modified rosin was then added a slurry of zinc oxide (7.5 g) and magnesium oxide (17.7 g) with water (5.9 g), acetic acid (1.9 g), diethylene glycol (2.0 g) and toluene (255 g) and the mixture brought to reflux at 106° C. for 1 hour and 30 minutes. During this time, water was removed by the azeotropic distillation of toluene. A slurry of calcium hydroxide (73.2 g) in toluene (295 g) was then added with continued reflux and removal of water of reaction. After all the water was removed, an additional 341.8 g of toluene and 36.0 g of rosin were added to bring the viscosity of the product to a value of Y (Gardner) and the solids level to 49.1% solids. The measured toluene dilution of the final product was 110 mls or a concentration at print viscosity (CPV) of 24.9.

EXAMPLE 2

Comparative Example

A resinate was prepared generally according to the procedure of Example 1 but without the use of polystyrene. After sufficient calcium hydroxide was added to increase the dilution at 49.9% to 100 mls, the resinate viscosity at this dilution and NV was found to be an unacceptably high value of Z3 (Gardner), well above the Z-Z1 target value at 49.9% NV. Despite the undesirably high resinate viscosity, the resinate dilution was only 100 mls.

EXAMPLE 3

A resinate was prepared, generally following the procedure of Example 1, in which polystyrene was used amounting to 9% by weight of the final resinate formulation on a solids basis. This resinate had the following properties: 50.1% NV, Z plus viscosity, 158° C. melting point and a dilution of 129 mls.

EXAMPLE 4

A resinate was prepared following the procedure of Example 1 using 587.4 g of Unitol NCY, 147 g of tall oil pitch, 1.48 g of acetic acid, 1.6 g of diethylene glycol and 63 g of fumaric acid. To the initial charge was added 17.0 g or 2.0% by weight on total solids in the formula of a styrene-maleic anhydride copolymer having a weight average molecular weight of about 275,000 and a maleic anhydride content of about 5 weight percent (a product sold as Dylark 132 by Arco Chemical Company, Newtown Square, Pa.). These materials were neutralized with sufficient zinc oxide, magnesium oxide, and calcium hydroxide, following the procedure of Example 1, to achieve a viscosity of Z1 on the Gardner scale at a non-volatiles content of 48.8%. This resinate had 121 mls dilution and a capillary melting point of 178°–198° C.

EXAMPLE 5

A resinate was prepared following the procedure of Example 1 and using 587.4 g of Unitol NCY, 146.9 g of tall oil pitch, 62.6 g of fumaric acid, 1.48 g of acetic acid and 1.6 g of diethylene glycol. After the resinate was treated with 5.9 g of zinc oxide and 13.8 g of magnesium oxide and then with 31.2 g of calcium hydroxide, 56.1 g of a carboxylated polystyrene latex (known as Lytron 5200, a product of the Morton Chemical Division of Morton Thiokol, Inc.) having an acid number of 15 (on the solids) and containing about 48% solids and 52% water. This is a use level of about 3% by weight on solids of the total formula. After addition of the latex and removal of water by azeotropic distillation, the product had a viscosity of Z1 at 49.0% NV, a capillary melting range of 175°–190° C., and a dilution of 110 mls.

What is claimed is:

1. A resinous binder comprised of (a) a major proportion of a metal rosin resinate and (b) a minor proportion of a carboxylated polystyrene resin having a weight average molecular weight of at least 50,000 and an acid number less than 200; said carboxylated polystyrene resin being present in the resinous binder in an amount which is effective to increase the dilution of the resinous binder as compared to the dilution of the metal rosin resinate alone.

2. A resinous binder comprised of a major proportion of (a) a metal rosin resinate and (b) a minor proportion of a carboxylated polystyrene resin; said resin being derived from a styrene maleic anhydride copolymer containing from 4 to 10 mole percent polymer chain units by reaction with water, a mono-alcohol, or amono-amine, and having a weight average molecular weight greater than 50,000 and an acid number less than 200 wherein said minor proportion is an amount which is effective to impart a toluene dilution value of at least 90 mls to a print viscosity of about 7.5 cps measured from a concentration of 50% solids of the resinous binder.

3. The resinous binder according to claim 2 wherein the metal of the metal rosin resinate is selected from the group consisting of zinc, magnesium and calcium.

4. The resinous binder according to claim 2 wherein the metal rosin resinate is prepared from a rosin selected from the group consisting of gum rosin, wood rosin, tall oil rosin, polymerized rosin, dimerized rosin, maleic-modified rosin, fumaric-modified rosin, formaldehyde-modified rosin, tall oil pitch modified rosin, dicyclopentadiene-modified rosin and phenol-modified rosin.

5. The resinous binder according to claim 2 wherein the polystyrene type resin has an acid number of less than 125.

6. The resinous binder according to claim 2 wherein the polystyrene type resin contains up to 40% by weight of monomeric units obtained by copolymerization of styrene with a member selected from the group consisting of isoprene, butadiene, acrylonitrile, an acrylic acid ester, a methacrylic acid ester and a p-alkyl substituted styrene.

7. The resinous binder according to claim 2 comprised of from about 0.1 to about 20% by weight of the polystyrene type resin.

8. The resinous binder according to claim 2 comprised of from about 0.5 to about 20% by weight of the polystyrene type resin.

9. A printing ink composition comprised of a colorant, a solvent and a component binder wherein at least a portion of the component binder is a resinous binder comprised of a major proportion of a metal rosin resinate and a minor proportion of a carboxylated polystyrene resin having a weight average molecular weight of at least 50,000 and an acid number less than 200; said carboxylated polystyrene resin being present in the resinous binder in an amount which is effective to increase the dilution of the resinous binder as compared to the dilution value of the metal resinate alone.

10. An ink composition comprised of a colorant, a solvent and a binder component wherein at least a portion of the binder component is a resinous binder comprised of a major proportion of (a) a metal rosin resinate and (b) a minor proportion of a carboxylated polystyrene resin; said resin being derived from a styrene maleic anhydride copolymer containing from 4 to 10 mole percent polymer chain units by reaction with water, a mono-alcohol, or amono-amine, and having a weight average molecular weight greater than 50,000 and an acid number less than 200 wherein said minor proportion is an amount which is effective to impart to toluene dilution value of at least 90 mls to a print viscosity of about 7.5 cps measured from a concentration of 50% solids of said resinous binder.

11. The ink composition according to claim 10 wherein the metal of the metal rosin resinate is selected from the group consisting of zinc, magnesium and calcium.

12. The ink composition according to claim 10 wherein the metal rosin resinate is prepared from a rosin selected from the group consisting of gum rosin, wood rosin, tall oil rosin, polymerized rosin, dimerized rosin, maleic-modified rosin, fumaric-modified rosin, formaldehyde-modified rosin, tall oil pitch modified rosin, dicyclopentadiene-modified rosin and phenol-modified rosin.

13. The ink composition according to claim 10 wherein the polystyrene type resin has an acid number of less than 125.

14. The ink composition according to claim 10 wherein the polystyrene type resin contains up to 40% by weight of monomer units obtained by copolymerization of styrene with a member selected from the group consisting of isoprene, butadiene, acrylonitrile, an acrylic acid ester, a methacrylic acid ester and a p-alkyl substituted styrene.

15. The ink composition according to claim 10 wherein there sinous binder is comprised of from about 0.1 to about 20% by weight of the polystyrene type resin.

16. The ink composition according to claim 10 wherein the resinous binder is comprised of from about 0.5 to about 20% by weight of the polystyrene type resin.

* * * * *